United States Patent [19]
Kang

[11] Patent Number: 5,900,991
[45] Date of Patent: May 4, 1999

[54] COMPACT WIDE-ANGLE ZOOM LENS SYSTEM

[75] Inventor: Geon-Mo Kang, Kyeongsangnam-do, Rep. of Korea

[73] Assignee: Samsung Aerospace Industries, Ltd., Kyeongsangnam-do, Rep. of Korea

[21] Appl. No.: 08/921,596

[22] Filed: Sep. 2, 1997

[30] Foreign Application Priority Data

Aug. 30, 1996 [KR] Rep. of Korea ..................... 96-36723

[51] Int. Cl.$^6$ ................................................. G02B 15/14
[52] U.S. Cl. ............................................................ 359/692
[58] Field of Search ................................... 359/676, 691, 359/692, 754, 795, 708

[56] References Cited

U.S. PATENT DOCUMENTS

| | | | |
|---|---|---|---|
| 4,936,661 | 6/1990 | Betensky et al. | 359/692 |
| 5,412,508 | 5/1995 | Lin | 359/692 |

FOREIGN PATENT DOCUMENTS

| | | |
|---|---|---|
| 5-82696 | 4/1993 | Japan . |
| 5-224122 | 9/1993 | Japan . |
| 5-289294 | 11/1993 | Japan . |

*Primary Examiner*—Huy Mai
*Attorney, Agent, or Firm*—Finnegan, Henderson, Farabow, Garrett & Dunner, L.L.P.

[57] ABSTRACT

The invention comprises a zoom lens system including two lens groups. The first lens group has an overall positive refractive power, and includes three sub-group lens units. The first sub-group lens unit has a negative refractive power, the second sub-group lens unit has a positive refractive power, and the third sub-group lens unit has a positive refractive power. The second lens group has an overall negative refractive power and includes two sub-group lens units. The fourth sub-group lens unit has a positive refractive power, and the fifth sub-group lens unit has a negative refractive power. The magnification of the system can be changed by varying a distance between the first lens group and the second lens group, wherein the following conditions are satisfied:

$Mt/Mw > 1.95$, $0.20 < fbw/fw < 0.37$, where:

Mt represents the magnification of the second lens group at a telephoto position;

Mw represents the magnification of the second lens group at a wide-angle position;

fw represents a focal length of the zoom lens system at the wide-angle position; and fbw represents a back focal length of the zoom lens system at the wide-angle position.

27 Claims, 14 Drawing Sheets

COMPACT WIDE-ANGLE ZOOM LENS SYSTEM

BACKGROUND OF THE INVENTION

A. Field of the Invention

The present invention relates to a compact wide-angle zoom lens system, and, more particularly, to a compact wide-angle zoom lens system comprising two lens groups and having a zoom ratio of about 2.0 times.

B. Description of the Related Art

Automatic compact cameras have been recently provided with zoom lenses and panorama structures. As a result, users require these cameras to be compact and to have a wide viewing angle. In order to reduce a camera's size, however, the camera's optical system must first be reduced.

Generally, zoom lens systems for compact cameras can be divided into two types: those having two lens groups and those having three lens groups. The two lens group type is compact and light, but does not provide a high magnification. The three lens group type, on the other hand, provides a high magnification, but is large and heavy.

Zoom lens systems having two lens groups are disclosed in tile U.S. Pat. No. 4,936,661 and Japanese Publication Nos. Hei 5-224122, Hei 5-82696, and Hei 5-289294. The zoom lens system of U.S. Pat. No. 4,936,661 has a very short back focal length, making the size of the rear lens group large in order to obtain a marginal illumination. As a consequence, it is very difficult to reduce the lens system's size.

The zoom lens system of Hei 5-224122 does not have a wide angle. It, therefore, has a large telephoto ratio at a telephoto position which also makes it difficult to obtain a compact camera. The zoom lens system of Hei 5-82696 suffers from the fact that it has a poor zoom ratio of less than 1.9 times. The zoom lens system of Hei 5-289294 has a large telephoto ratio at a telephoto position, but has a large number of lenses making it expensive to manufacture.

SUMMARY OF THE INVENTION

Zoom lens systems consistent with the present invention provide a compact wide-angle zoom lens system having two lens groups and a high zoom ratio. The zoom lens system is also compact and has a wide angle and small telephoto ratio.

To achieve these and other advantages, the invention comprises a zoom lens system including two lens groups. The first lens group has an overall positive refractive power, and includes three sub-group lens units. The first sub-group lens unit has a negative refractive power, the second sub-group lens unit has a positive refractive power, and the third sub-group lens unit has a positive refractive power. The second lens group has an overall negative refractive power and includes two sub-group lens units. The fourth sub-group lens unit has a positive refractive power, and the fifth sub-group lens unit has a negative refractive power.

The magnification of the system can be changed by varying a distance between the first lens group and the second lens group, wherein the following conditions are satisfied:

$$Mt/Mw > 1.95,$$

$$0.20 < fbw/fw < 0.37,$$

where:

Mt represents the magnification of the second lens group at a telephoto position;

Mw represents the magnification of the second lens group at a wide-angle position;

fw represents a focal length of the zoom lens system at the wide-angle position; and fbw represents a back focal length of the zoom lens system at the wide-angle position.

It is to be understood that both the foregoing general description and the following detailed description are exemplary and are intended to provide further explanation of the claimed invention.

BRIEF DESCRIPTION OF THE DRAWINGS

The above objects and features of the present invention will be apparent from the following description of the preferred embodiments with reference to the accompanying drawings. In the drawings.

DETAILED DESCRIPTION

Zoom lens systems consistent with the invention will now be described in detail with reference to the accompanying drawings.

As shown in FIGS. 1, 3, 5, 7, 9, 11 and 13, preferred examples according to the present invention provide a compact wide-angle zoom lens system. The zoom lens system comprises a first lens group I and a second lens group II, and an aperture 10 formed between the two lens groups I and II.

The first lens group I, having an overall positive refractive power, includes three sub-group lens units. A first sub-group lens unit 1A has a negative refractive power, while a second sub-group lens unit 1B and a third sub-group lens unit 1C each have a positive refractive power. The second lens group II, having an overall negative refractive power, includes two sub-group lens units. A fourth sub-group lens unit 2D has a positive refractive power and a fifth sub-group lens unit 2E has a negative refractive power.

Figure 1:
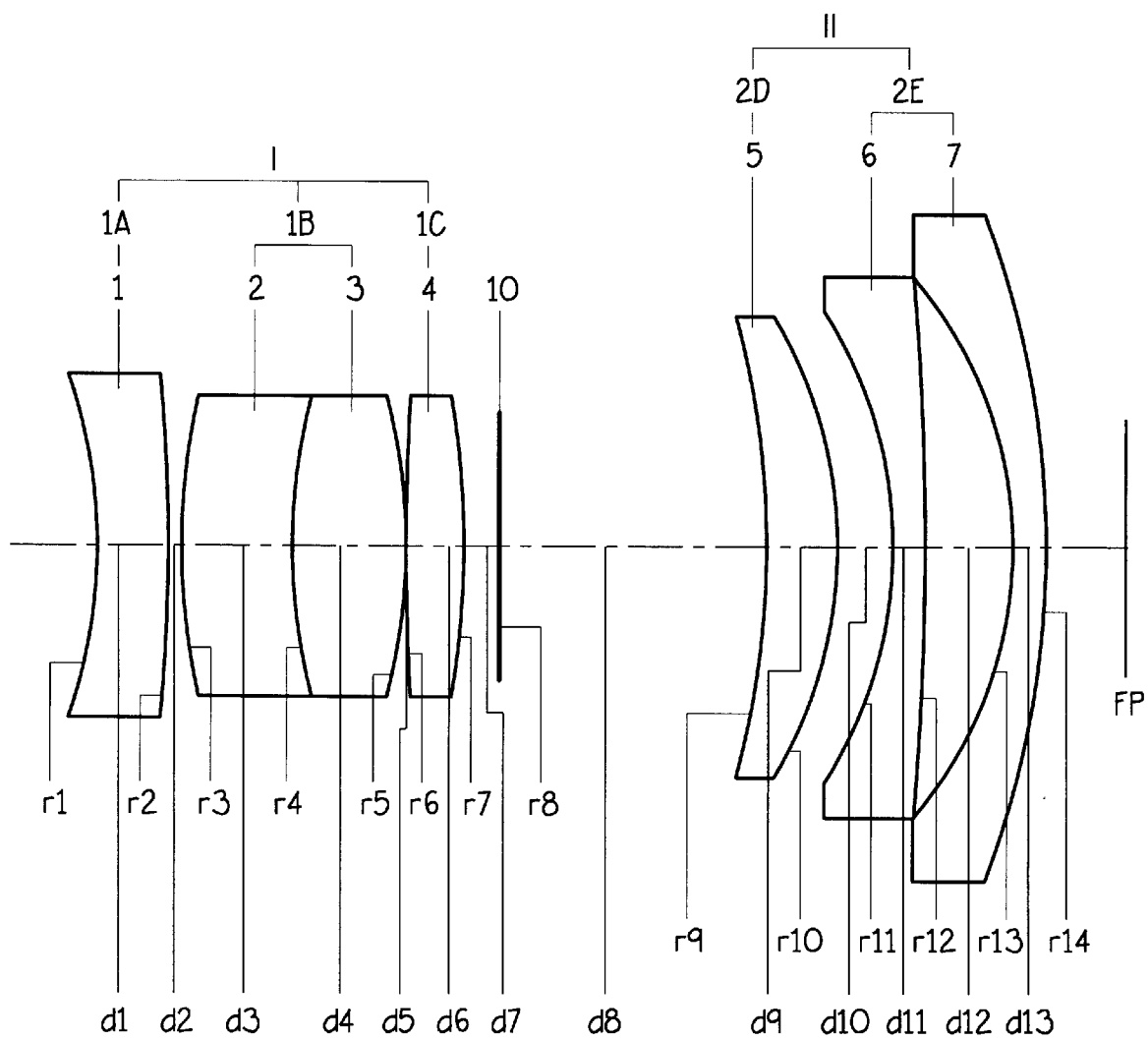
FIG. 1 is a schematic sectional view of a compact wide-angle zoom lens system according to a first example of the present invention.
Figure 3:
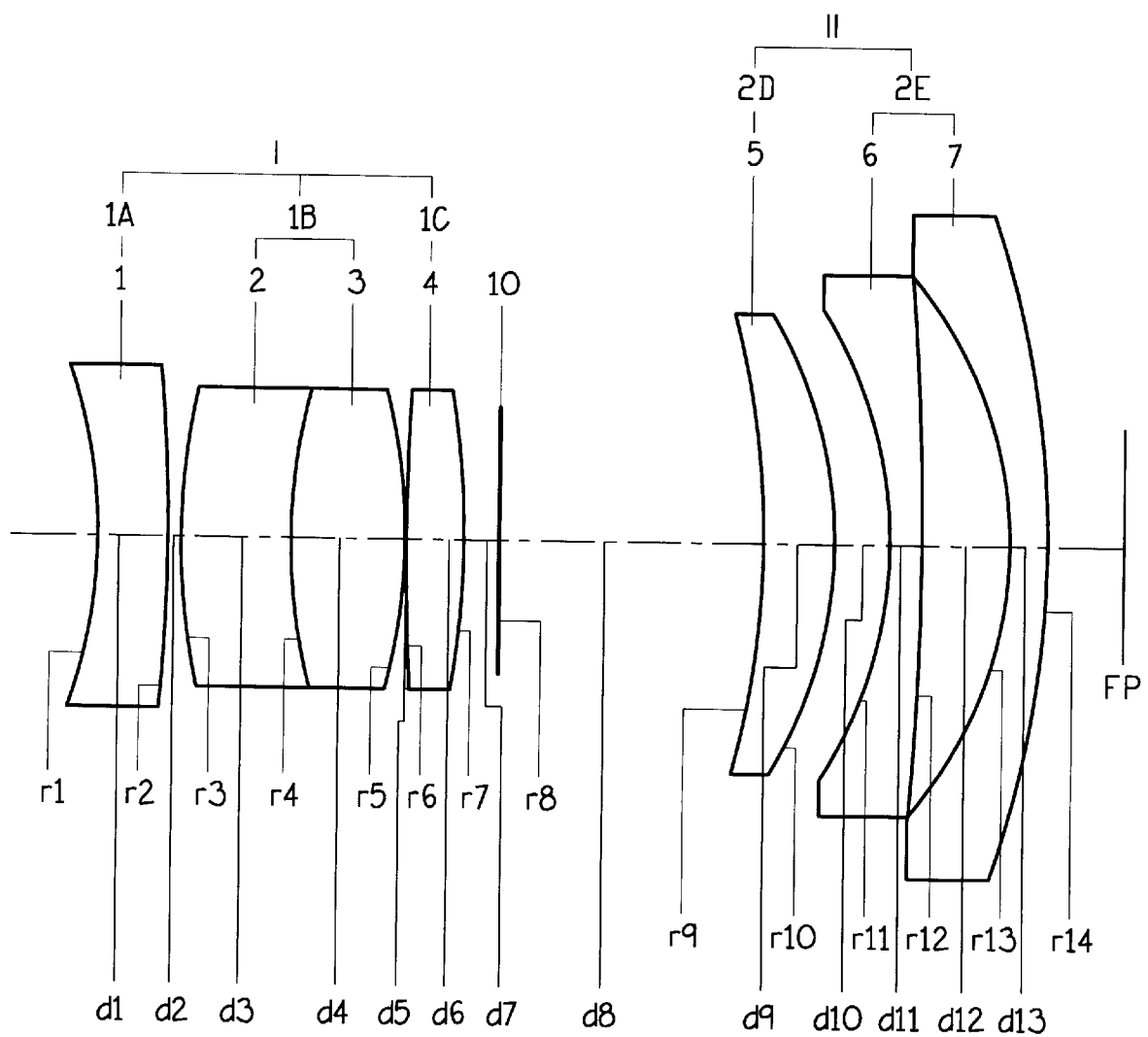
FIG. 3 is a schematic sectional view of a compact wide-angle zoom lens system according to a second example of the present invention.
Figure 5:
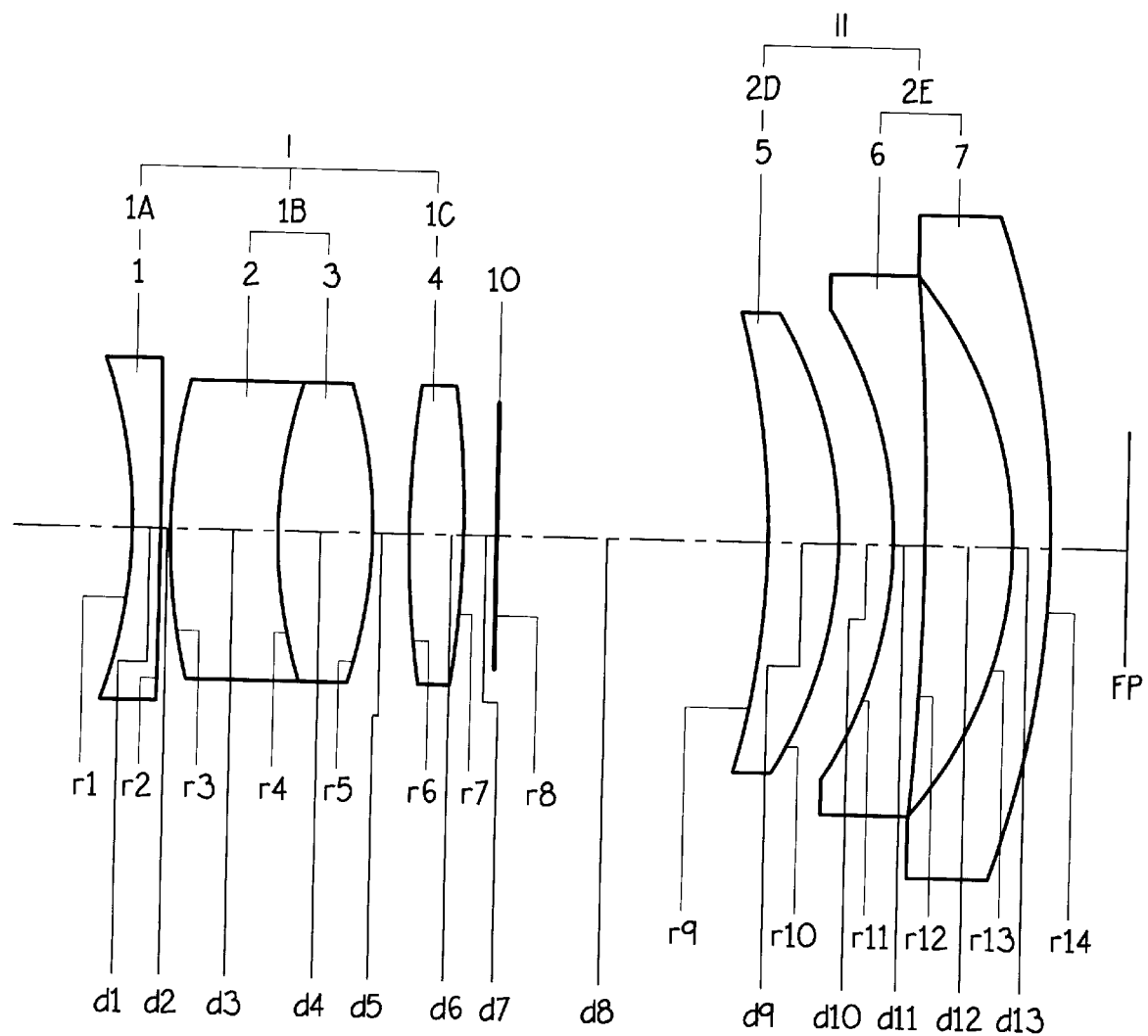
FIG. 5 is a schematic sectional view of a compact wide-angle zoom lens system according to a third example of the present invention.

As shown in FIGS. 1, 3 and 5, the first sub-group lens unit 1A comprises a first lens unit 1 having a negative refractive power. The second sub-group lens unit 1B comprises a second lens unit 2 and a third lens unit 3, each having a positive refractive power. Further, the third sub-group lens unit 1C comprises a fourth lens unit 4 having a positive refractive power. The fourth sub-group lens unit 2D comprises a fifth lens unit 5 having a positive refractive power, and the fifth sub-group lens unit 2E comprises a sixth 6 and a seventh 7 lens unit, each having a negative refractive power.

Figure 7:
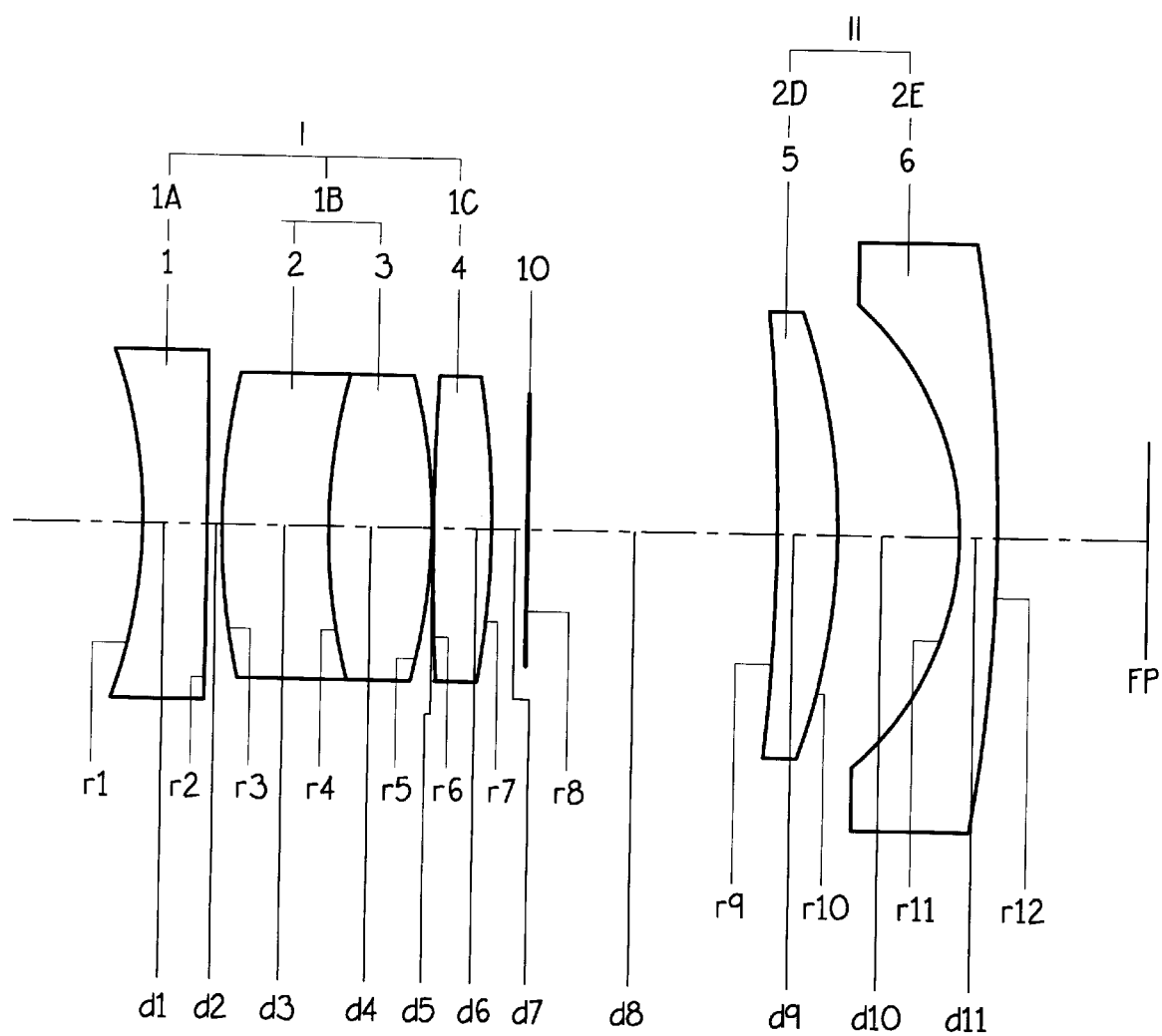
FIG. 7 is a schematic sectional view of a compact wide-angle zoom lens system according to a fourth example of the present invention.
Figure 9:
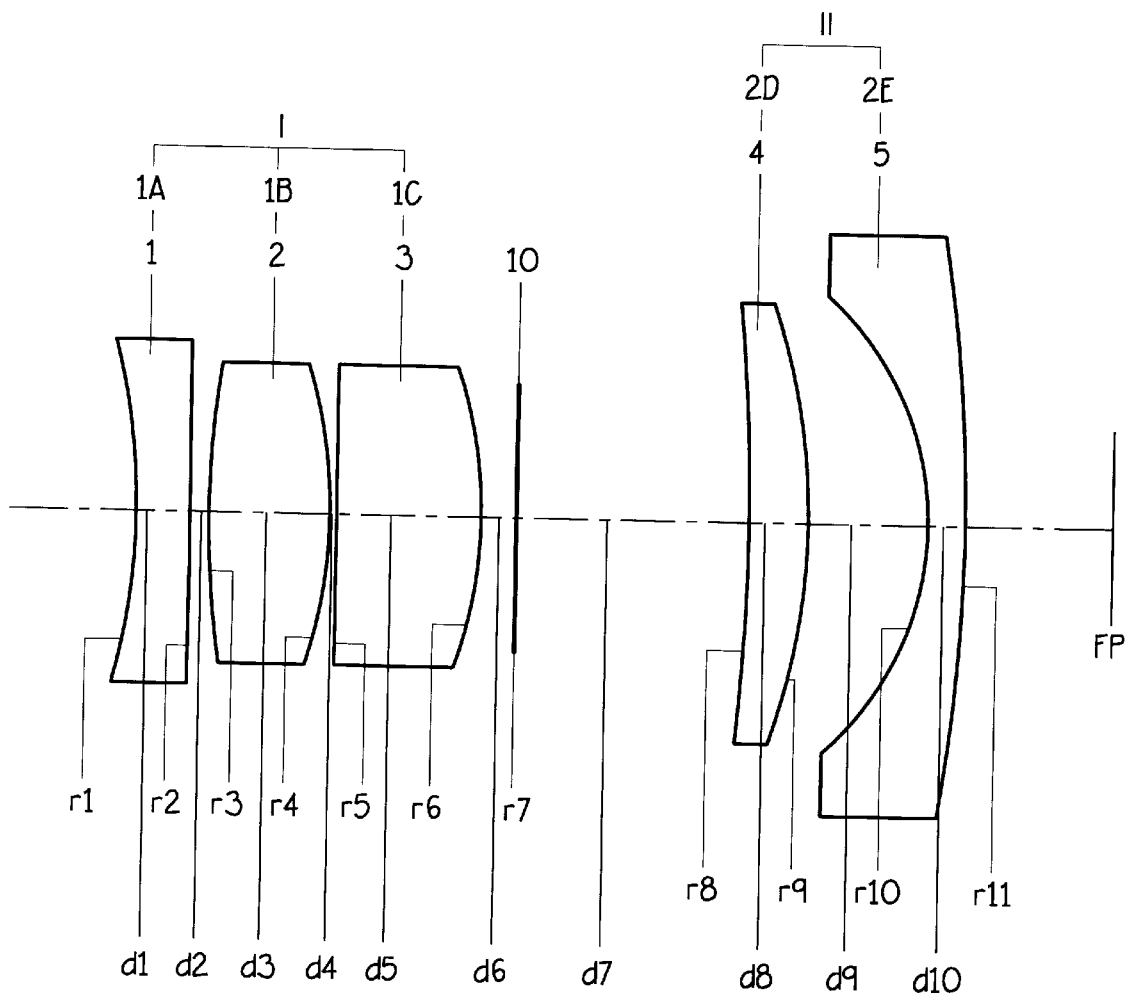
FIG. 9 is a schematic sectional view of a compact wide-angle zoom lens system according to a fifth example of the present invention.
Figure 11:
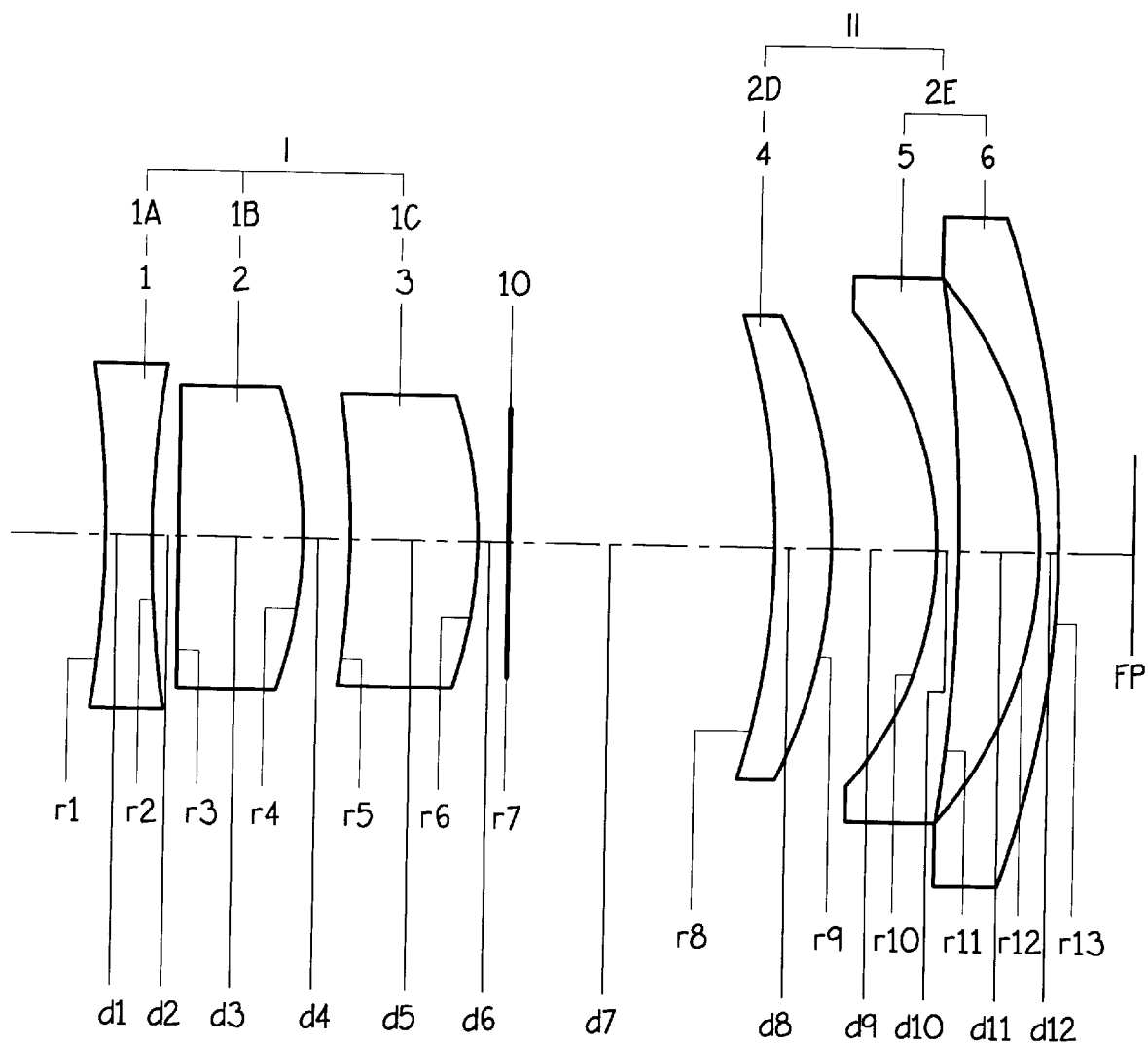
FIG. 11 is a schematic sectional view of a compact wide-angle zoom lens system according to a sixth example of the present invention.
Figure 13:
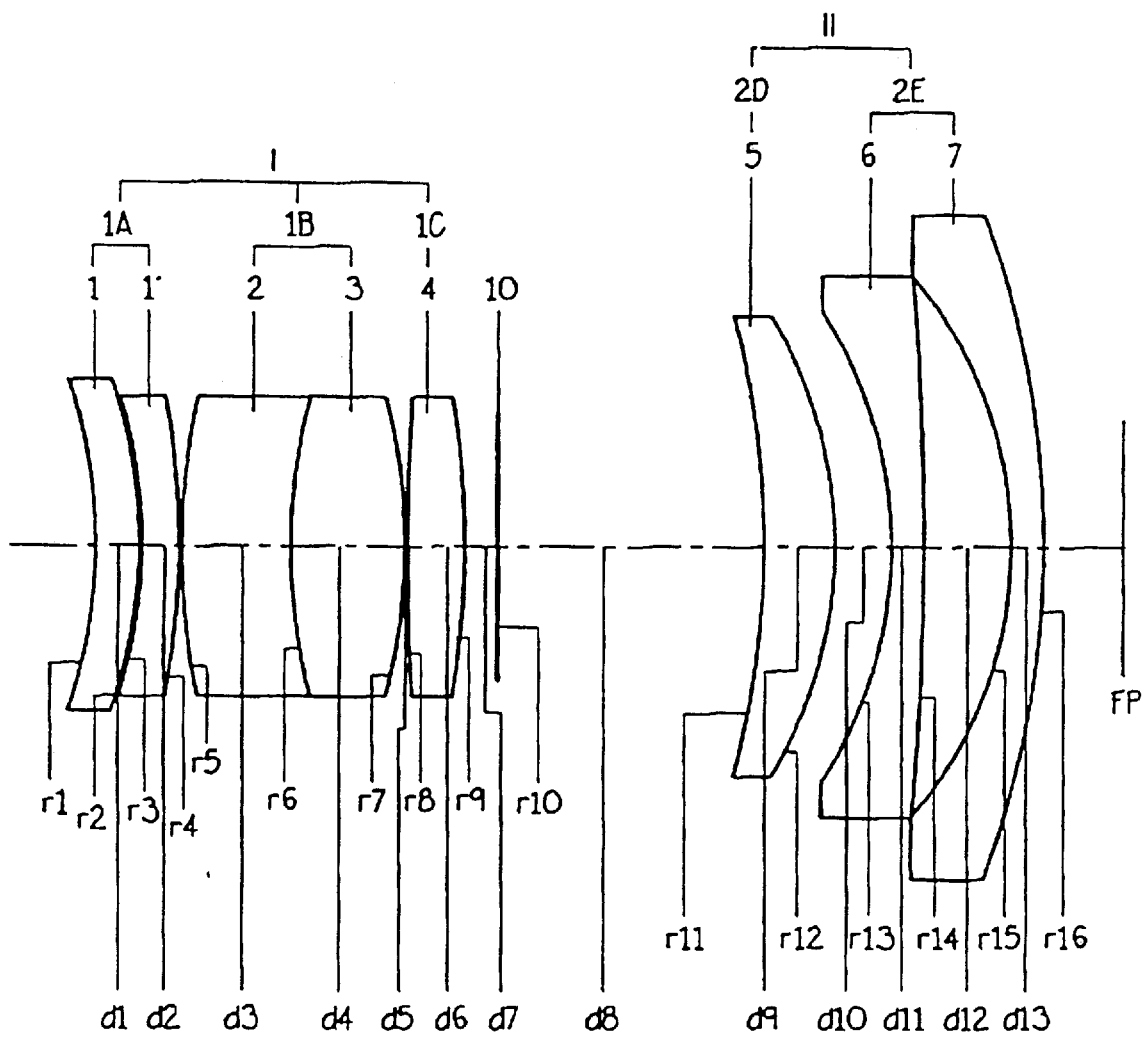
FIG. 13 is a schematic sectional view of a compact wide-angle zoom lens system according to a seventh example of the present invention.

As shown in FIG. 7, fifth sub-group lens unit 2E may comprise only sixth lens unit 6 having a negative refractive power. FIG. 9 illustrates that the example of FIG. 7 may be further modified by having second sub-group lens unit 1B as comprising only second lens unit 2 having a positive refractive power. In addition, FIG. 11 illustrates that the same modification described above with respect to FIG. 9 may be made to the examples of FIGS. 1, 3, and 5. Finally, FIG. 13 shows that first sub-group lens unit 1A may comprise two lens units 1 and 1'.

When zooming from a wide-angle position to a telephoto position, the first and second lens groups I and II move toward an object side (i.e., the left side of the Figures), and the distance between the two groups changes as well. Zoom lens systems consistent with a first embodiment of the present invention satisfy the following conditions:

$$Mt/Mw > 1.95 \tag{1}$$

$$0.20 < fbw/fw < 0.37 \tag{2}$$

$$0.55 < f1/fw < 0.75 \tag{3}$$

$$0.45 < |f2/fw| < 0.65 \tag{4}$$

$$Lt < ft < 1.00 \tag{5}$$

$$0.65 < (Lt - Lw)/fw < 1.10 \tag{6}$$

$$0.50 < |f1a/fw| < 1.10 \tag{7}$$

$$0.45 < f1b/fw < 0.85 \tag{8}$$

$$0.70 < f1c/fw < 1.20 \tag{9}$$

$$0.90 < f2a/fw < 1.80 \tag{10}$$

$$0.25 < |f2b/fw| < 0.50 \tag{11}$$

$$1.48 < N1p < 1.65 \tag{12}$$

$$45.0 < V1p < 85.0 \tag{13}$$

$$1.75 < N1n < 1.85 \tag{14}$$

$$30.0 < V1n < 45.0 \tag{15}$$

$$N1a > 1.75 \tag{16}$$

$$35.0 < V1a < 45.0 \tag{17}$$

$$1.49 < N1b < 1.70 \tag{18}$$

$$35.0 < V1b < 85.0 \tag{19}$$

$$1.49 < N1c < 1.55 \tag{20}$$

$$40.0 < V1c < 85.0 \tag{21}$$

$$1.65 < N2p < 1.85 \tag{22}$$

$$23.0 < V2p < 40.0 \tag{23}$$

$$1.75 < N2n < 1.85 \tag{24}$$

$$40.0 < V2n < 50.0 \tag{25}$$

where:

Mt represents a magnification of the second lens group II at a telephoto position;

Mw represents a magnification of the second lens group II at a wide-angle position;

fw represents a focal length of the zoom lens system at a wide-angle position;

fbw represents a back focal length of the zoom lens system at a wide-angle position;

f1 represents a focal length of the first lens group I;

f2 represents a focal length of the second lens group II;

Lt represents the overall length of the zoom lens system (measured from a first lens surface $r_1$ of the zoom lens system to a focal plane FP) at a telephoto position;

ft represents a focal length of the zoom lens system at a telephoto position;

Lw represents the overall length of the zoom lens system at a wide-angle position;

f1a represents a focal length of the first sub-group 1A;

f1b represents a focal length of the second sub-group 1B;

f1c represents a focal length of the third sub-group 1C;

f2a represents a focal length of the fourth sub-group 2D;

f2b represents a focal length of the fifth sub-group 2E;

N1p represents an average refractive index of lenses in the first lens group I having a positive refractive power;

V1p represents an average Abbe number of lenses in the first lens group II having a positive refractive power;

N1n represents an average refractive index of lenses in the first lens group I having a negative refractive power;

V1n represents an average Abbe number of lenses in the first lens group I having a negative refractive power;

N1a represents an average refractive index of the first sub-group lens unit 1A;

V1a represents an average Abbe number of the first sub-group lens unit 1A;

N1b represents an average refractive index of the second sub-group lens unit 1B;

V1b represents an average Abbe number of the second sub-group lens unit 1B;

N1c represents an average refractive index of the third sub-group lens unit 1C;

V1c represents an average Abbe number of the third sub-group lens unit 1C;

N2p represents an average refractive index of lenses in the second lens group II having a positive refractive power;

V2p represents an average Abbe number of lenses in the second lens group II having a positive refractive power;

N2n represents an average refractive index of lenses in the second lens group II having a negative refractive power; and V1n represents an average Abbe number of lenses in the second lens group II having a negative refractive power.

Conditions (1) and (2) relate to a zoom ratio and a back focal length at the wide-angle position, respectively. Condition (1) may thus be used to obtain a high zoom ratio. If the lower limit of condition (2) is violated, the back focal length at the wide-angle position becomes short. This causes the size of the second lens group II to become large, making it difficult to obtain a compact and light zoom lens system. If the upper limit of condition (2) is violated, the refractive power of the second lens group II decreases and the amount of shift of the second lens group II will increase.

Condition (3) relates to the refractive power of the first lens group I. If the lower limit of condition (3) is violated, the refractive power of the first lens group I increases. This, in turn, will increase a change in aberration when zooming. If the upper limit of condition (3) is violated, the refractive power of the first lens group I decreases. As a result, it will be easy to compensate for aberrations, but the shift amount of the first lens group I increases.

Condition (4) relates to the refractive power of the second lens group II. If the lower limit of condition (4) is violated, the refractive power of the second lens group II increases, thereby increasing aberrations during zooming. If the upper limit of condition (4) is violated, the refractive power of the first lens group I decreases. As a result, it becomes easy to compensate for aberrations, but a shift amount of the second lens group II increases.

Condition (5) relates to a telephoto ratio at the telephoto position and is used to obtaining a compact zoom lens system. Condition (6) relates to the shift amount of the first lens group I during zooming. If the lower limit of condition (6) is violated, the shift amount of the first lens group I decreases, making it easy to produce a compact the zoom lens system. However, the refractive power of the first lens group I will increase, and thereby cause an increase in aberration during zooming. If the upper limit of condition (6) is violated, it will be difficult to produce a compact zoom lens system.

Conditions (7) to (9) relate to the refractive powers of the first sub-group 1A, the second sub-group 1B and the third sub-group 1C, respectively. If the lower limits of conditions (7) to (9) are violated, the refractive powers of sub-groups 1A to 1C increase. This will make it easy to produce a compact zoom lens system. However, a coma aberration and a spherical aberration will become large. If the upper limits of conditions (7) to (9) are violated, the refractive powers of sub-groups 1A to 1C will decrease, making it easy to compensate for aberrations. However, a shift amount of the first lens group I during zooming increases so that it will be difficult to produce a compact zoom lens system.

Conditions (10) and (11) relate to the refractive power of fourth sub-group 2D and the fifth sub-group 2E, respectively. If the lower limits of conditions (10) and (11) are violated, the refractive power of sub-groups 2D and 2E increases. This will make it easy to produce a compact zoom lens system, but the curvature of field and an astigmatism will increase. If the upper limits of conditions (10) and (11) are violated, it becomes easy to compensate for aberrations. However, a shift amount of the second lens group II during zooming increases.

Conditions (12) and (13) relate to materials of lenses in the first lens group I having a positive refractive power. If the lower limit of condition (12) and the upper limit of condition (13) are violated, materials having a very low dispersion should be used. This will, however, increase the cost of materials and the cost of processing the zoom lens system. If the upper limit of condition (12) and the lower limit of condition (13) are violated, chromatic aberration increases.

Conditions (14) and (15) relate to materials of lenses in the first lens group I having a negative refractive power. If the lower limit of condition (14) is violated, a curvature of field and an astigmatism will increase. If the upper limit of condition (14) is violated, the cost of materials increases. Further, if the lower limit and upper limits of condition (15) are violated, it becomes difficult to compensate for a chromatic aberration.

Conditions (16) and (17) relate to materials of the first sub-group unit 1A. If the lower limit and the upper limit of condition (16) are violated, a spherical aberration and a coma aberration will increase. If the lower and upper limits of condition (17) are violated, the chromatic aberration will increase.

Conditions (18) and (19) relate to materials of the second sub-group unit 1B, and conditions (20) and (21) relate to materials of the third sub-group unit 1C. If the lower limits of conditions (18) and (20) and the upper limits of conditions (19) and (21) are violated, materials having a very low dispersion should be used. This will, however, increase the cost of materials and the cost of processing of the zoom lens system. If the upper limits of conditions (18) and (20) and the lower limits of conditions (19) and (21) are violated, it becomes difficult to compensate for chromatic aberration.

Conditions (22) and (23) relate to materials of lenses in the second lens group II having a positive refractive power, while conditions (24) and (25) relate to materials of lenses in the second lens group II having a negative refractive power. If the lower limits of conditions (22) and (24) are violated, then a curvature of field and the astigmatism will increase. If either the upper limits of conditions (22) and (24) or the lower limits of conditions (23) and (25) are violated, the cost of materials will increase. If the upper limits of conditions (23) and (25) are violated, it becomes difficult to compensate for a chromatic aberration.

A compact wide-angle zoom lens system consistent with a second embodiment of the present invention will now be described. The construction of a zoom lens system according to the second embodiment is the same as that described above with respect to the first embodiment, with the exception that the first lens group I has at least one a spherical surface and a lens surface of the first sub-group unit 1A is concave. Zoom lens systems consistent with the second embodiment of the present invention satisfy the following conditions:

$Mt/Mw > 1.90$ (26)

$0.18 < fbw/fw < 0.37$ (27)

$0.50 < f1/fw < 0.80$ (28)

$0.45 < |f2/fw| < 0.70$ (29)

$Lt/ft < 1.05$ (30)

$0.65 < (Lt-Lw)/fw < 1.15$ (31)

$0.45 < |f1a/fw| < 1.15$ (32)

$0.40 < f1b/fw < 0.90$ (33)

$0.75 < f1c/fw < 1.25$ (34)

$0.85 < f2a/fw < 1.85$ (35)

$0.20 < |f2b/fw| < 0.55$ (36)

$1.48 < N1p < 1.60$ (37)

$45.0 < V1p < 85.0$ (38)

$1.70 < N1n < 1.85$ (39)

$25.0 < V1n < 45.0$ (40)

$N1a > 1.70$ (41)

$30.0 < V1a < 45.0$ (42)

$1.48 < N1b < 1.75$ (43)

$30.0 < V1b < 85.0$ (44)

$1.48 < N1c < 1.60$ (45)

$45.0 < V1c < 85.0$ (46)

$1.57 < N2p < 1.85$ (47)

$23.0 < V2p < 45.0$ (48)

$1.75 < N2n < 1.85$ (49)

$35.0 < V2n < 55.0$ (50)

Conditions (26) to (50) are the same as conditions (1) to (25) with the exception that their upper and/or lower limits have been changed in accordance with the values used in the second embodiment. Accordingly, these conditions will not be described further.

A compact wide-angle zoom lens system consistent with a third embodiment of the present invention will now be described. The construction of a zoom lens system according to the third embodiment is the same as that described above with respect to the second embodiment, with the exception that the second sub-group unit 1B comprises less than two lenses. Zoom lens systems consistent with the third embodiment of the present invention satisfy, in addition to conditions (30) to (50), the following conditions:

$Mt/Mw > 1.85$ (51)

$0.15 < fbw/fw < 0.40$ (52)

$0.50 < f1/fw < 0.80$ (53)

$0.45 < |f2/fw| < 0.70$ (54)

Conditions (51) to (54) are the same as conditions (1) to (4) with the exception that their upper and lower limits have been changed in accordance with the values used in the third embodiment. Accordingly, these conditions will not be described further.

A coefficient of an aspherical lens of a compact wide-angle zoom lens systems consistent with the present invention, and which satisfies any of the above conditions (1) to (54), is expressed by the following equations:

$$Z = cS^2/\{1 + (1-(K+1)c^2S^2)^{1/2}\} + A_4S^4 + A_6S^6 + A_8S^8 + A_{10}S^{10}$$

$$c = 1/R$$

$$S^2 = X^2 + Y^2$$

where:

Z represents a distance from the lens vertex to an optical axis;

c represents a reciprocal of the radius of curvature;

S represents a distance perpendicular to the optical axis;

X represents a displacement amount from a reference surface along the optical axis;

K represents the conic constant; and $A_4, A_6, A_8, A_{10}$ represent aspherical coefficients.

Values which satisfy the above-mentioned conditions (1) to (54), according to preferred embodiments of the invention, are described in the Tables below. In each of these Tables, all units of length are denominated in millimeters and the following variables are used:

$r_i$ (i=1 to 14) represents a radius of curvature of a refractive surface;

$d_i$ (i=1 to 14) represents the thickness of a lens or the length between lens units nd represents the d-line refractive index of a lens unit;

v represents the Abbe number of a lens unit; and

W represents the half viewing angle.

Values for a first example consistent with the present invention (see FIG. 1) are shown in Table 1, where: the focal length f ranges from 29.061 mm to 66.798 mm; the half viewing angle W ranges from 35.97° to 17.97° ; the back focal length fb ranges from 7.729 mm to 41.639 mm; and the iris value F of a large aperture zoom lens system ranges from 4.12 to 9.46.

TABLE 1

| surface number | radius of curvature $r_i$ | distance $d_i$ | refractive power nd | Abbe number v |
|---|---|---|---|---|
| 1 | −13.565 | 2.00 | 1.80610 | 40.73 |
| *2 | −114.286 | 0.52 | | |
| 3 | 18.668 | 3.50 | 1.84666 | 23.78 |
| 4 | 13.870 | 3.50 | 1.51823 | 58.96 |
| 5 | −13.690 | 0.15 | | |
| 6 | 40.110 | 1.59 | 1.49700 | 81.61 |
| 7 | −23.136 | 1.00 | | |
| 8 | aperture | Z1 | | |
| 9 | −37.453 | 2.20 | 1.76182 | 26.55 |
| 10 | −13.790 | 1.71 | | |
| 11 | −12.620 | 0.80 | 1.80420 | 46.50 |
| 12 | −386.100 | 3.44 | | |
| 13 | −10.594 | 1.00 | 1.80420 | 46.50 |
| 14 | −20.961 | | | | where * represents an aspherical surface and Z1 ranges from 8.126 mm to 2.200 mm during zooming.

According to the first example consistent with the present invention, the coefficient of the aspherical second lens surface is described by the above formula using the aspherical coefficients shown in Table 2.

TABLE 2

| Aspherical coefficients of the second surface | |
|---|---|
| K | 0.2000000000000E +3 |
| A4 | 0.1265577935248E −3 |
| A6 | 0.1835757865387E −5 |
| A8 | −0.1886623801063E −7 |
| A10 | 0 |

Figure 2A:
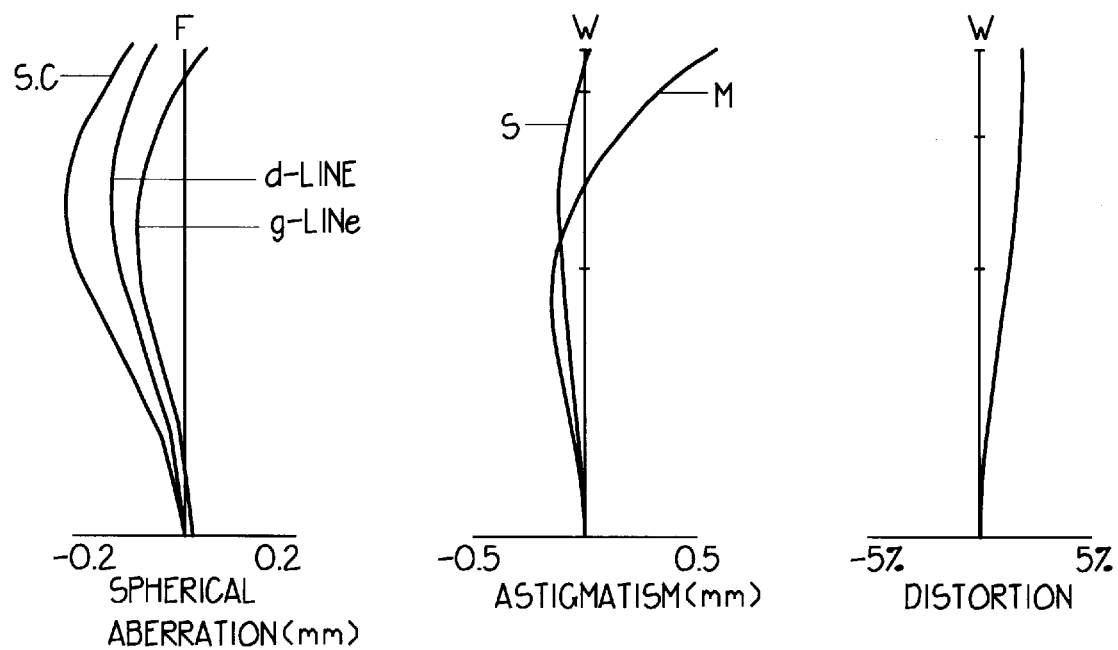
FIGS. 2A and 2B show the aberration curves of a compact zoom lens system at a wide-angle position and at a telephoto angle position, respectively, in accordance with a first preferred example of the invention.
Figure 2B:
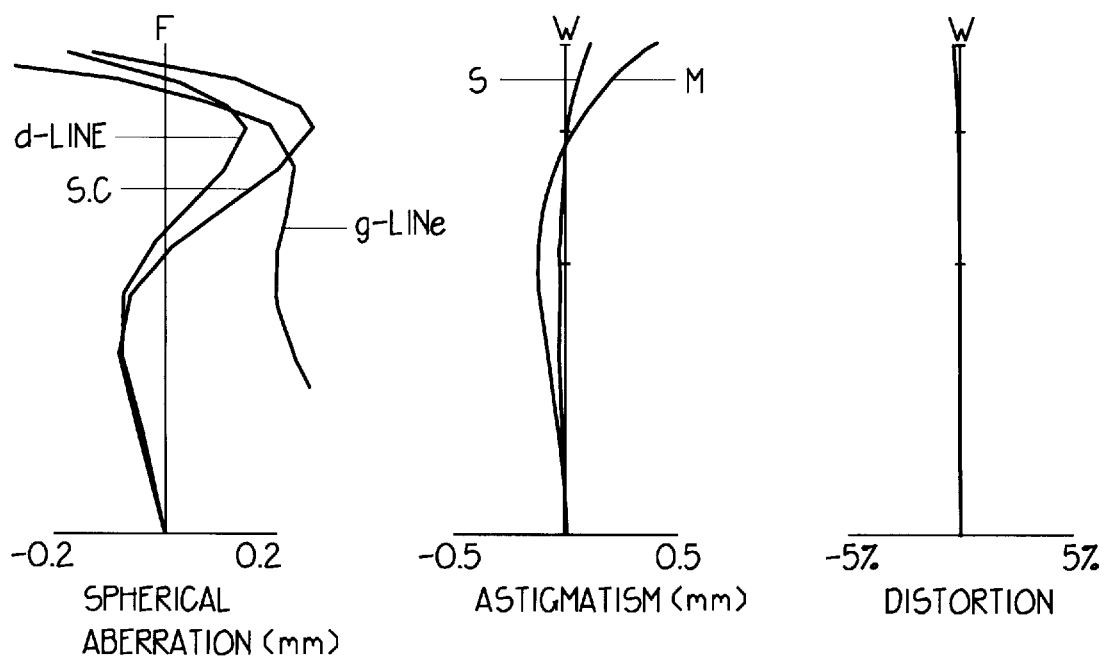

FIGS. 2A to 2B illustrate the superior aberration characteristics of the first preferred example, at a wide-angle and at a telephoto angle position, respectively. In FIG. 2, as well as in FIGS. 4, 6, 8, 10 and 12, the following variables are used: S.C. which represents the sine condition; d-line which represents the spherical aberration; g-line which represents the longitudinal chromatic aberration; S which represents astigmatism in the sagittal direction; and M which represents astigmatism in the tangential direction.

Values for a second preferred example consistent with the present invention (see FIG. 3) are shown in Table 3, where: a focal length f ranges from 29.074 mm to 66.862 mm; a half viewing angle W ranges from 35.96° to 17.93°; a back focal length fb ranges from 7.630 mm to 40.659 mm, and a iris value F ranges from 4.05 to 9.31.

TABLE 3

| surface number | radius of curvature $r_i$ | distance $d_i$ | refractive power nd | Abbe number v |
| --- | --- | --- | --- | --- |
| 1 | −13.261 | 2.00 | 1.80610 | 40.73 |
| *2 | −100.000 | 0.60 | | |
| 3 | 16.338 | 3.50 | 1.84666 | 23.78 |
| 4 | 10.960 | 3.50 | 1.51823 | 58.96 |
| 5 | −14.127 | 0.10 | | |
| 6 | 36.681 | 1.60 | 1.51742 | 52.15 |
| 7 | −24.582 | 1.00 | | |
| 8 | aperture | Z1 | | |
| 9 | −37.453 | 2.03 | 1.76182 | 26.55 |
| 10 | −14.382 | 1.62 | | |
| 11 | −14.683 | 0.80 | 1.80420 | 46.50 |
| 12 | −378.032 | 3.53 | | |
| 13 | −10.058 | 1.20 | 1.80420 | 46.50 |
| 14 | −23.384 | FB | | | where * represents an aspherical surface and Z1 ranges from 7.970 mm to 2.200 mm during zooming.

According to the second example consistent with the present invention, the coefficient of the aspherical second lens surface is described by the above formula using the aspherical coefficients shown in Table 4.

TABLE 4

| Aspherical coefficients of the second surface | |
| --- | --- |
| K | 0.2000000000000E +3 |
| A4 | 0.1249741714561E −3 |
| A6 | 0.1401483220193E −5 |
| A8 | −0.6210198872018E −8 |
| A10 | 0 |

Figure 4A:
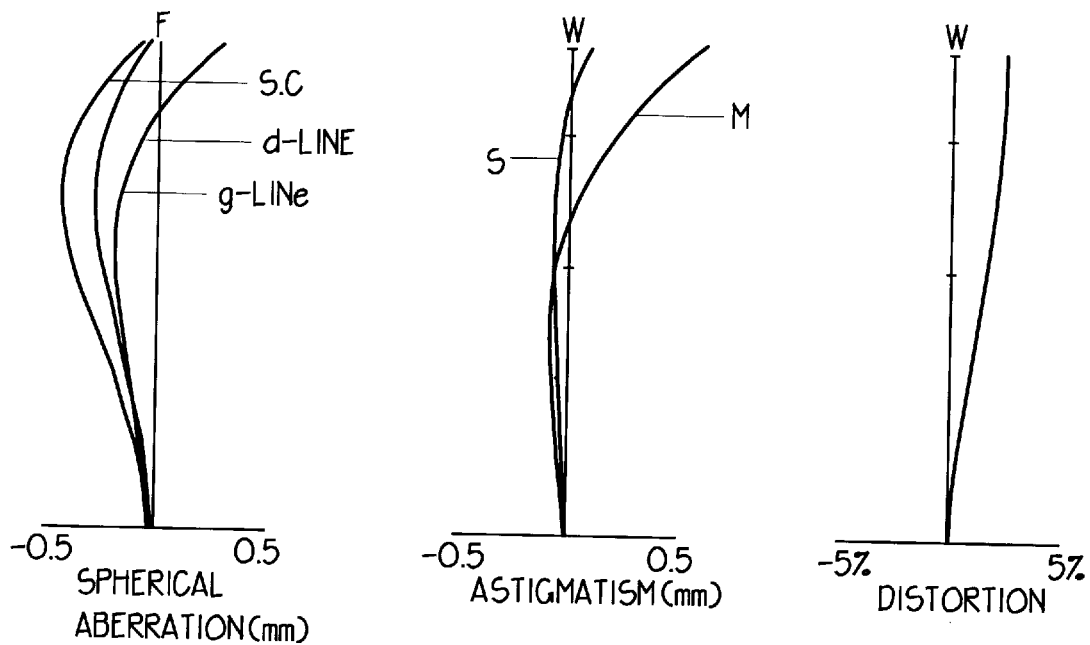
FIGS. 4A and 4B show the aberration curves of a compact zoom lens system at a wide-angle position and at a telephoto angle position, respectively, in accordance with a second preferred example of the invention.
Figure 4B:
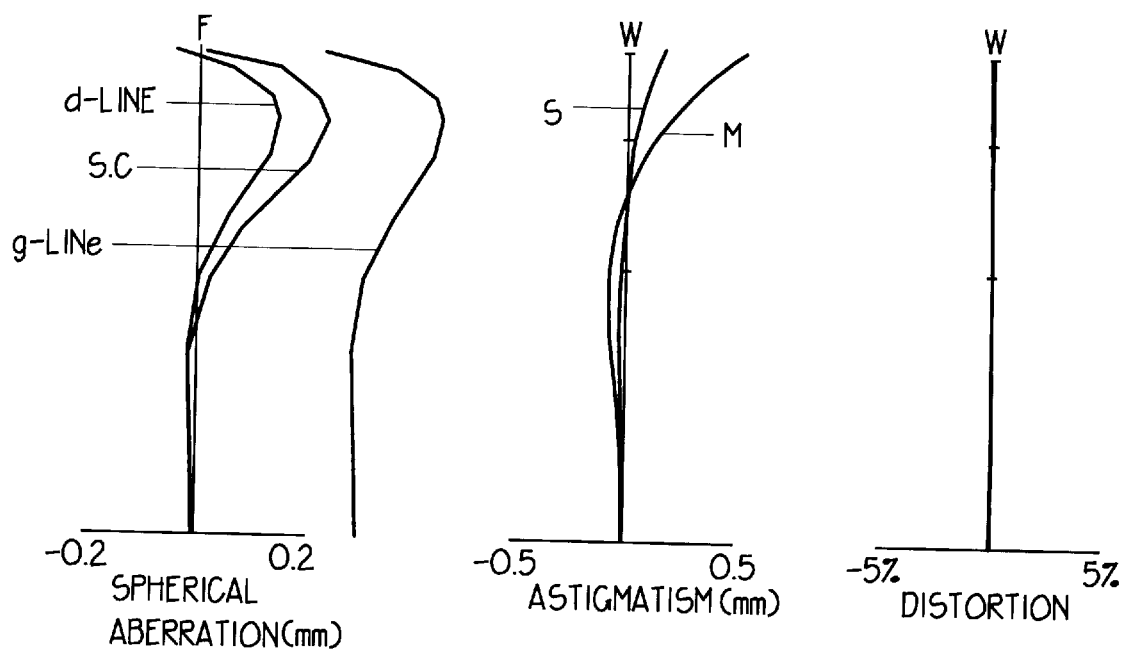

FIGS. 4A to 4B illustrate the superior aberration characteristics of the second preferred example, at a wide-angle and at a telephoto angle position, respectively.

Values for a third example consistent with the present invention (see FIG. 5) are shown in Table 5, where: the focal length f ranges from 39.499 mm to 109.933 mm; the half viewing angle W ranges from 27.99° to 11.08°; the back focal length fb ranges from 8.997 mm to 66.067 mm; and the iris value F ranges from 4.05 to 11.26.

TABLE 5

| surface number | radius of curvature $r_i$ | distance $d_i$ | refractive power nd | Abbe number v |
| --- | --- | --- | --- | --- |
| 1 | −12.221 | 1.09 | 1.80610 | 40.73 |
| *2 | −200.000 | 0.37 | | |
| 3 | 16.253 | 3.23 | 1.84666 | 23.78 |
| 4 | 11.690 | 2.97 | 1.51742 | 52.15 |
| 5 | −11.690 | 1.17 | | |
| 6 | 26.429 | 1.60 | 1.49700 | 81.61 |

TABLE 5-continued

| surface number | radius of curvature $r_i$ | distance $d_i$ | refractive power nd | Abbe number v |
| --- | --- | --- | --- | --- |
| 7 | −26.429 | 1.00 | | |
| 8 | aperture | Z1 | | |
| 9 | −37.453 | 1.90 | 1.76182 | 26.55 |
| 10 | −13.777 | 1.53 | | |
| 11 | −13.891 | 0.80 | 1.80420 | 46.50 |
| 12 | −377.466 | 3.35 | | |
| 13 | −9.317 | 1.00 | 1.77250 | 49.62 |
| 14 | −21.605 | FB | | | where * represents an aspherical surface and Z1 ranges from 7.034 mm to 1.600 mm during zooming.

According to the third example consistent with the present invention, the coefficient of the aspherical second lens surface is described by the above formula using the aspherical coefficients shown in Table 6.

TABLE 6

| Aspherical coefficients of the second surface | |
| --- | --- |
| K | 0.1000000000000E +4 |
| A4 | 0.1475619419408E −3 |
| A6 | 0.1991090113129E −5 |
| A8 | −0.1213954110301E −7 |
| A10 | 0 |

Figure 6A:
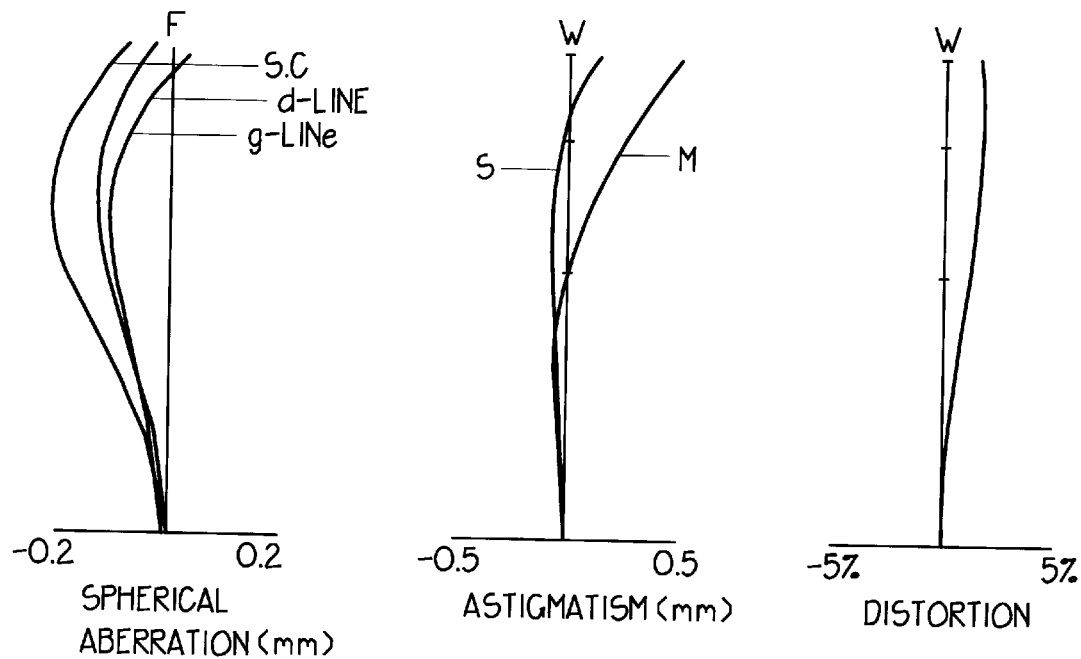
FIGS. 6A and 6B show the aberration curves of a compact zoom lens system at a wide-angle position and at a telephoto angle position, respectively, in accordance with a third preferred example of the invention.
Figure 6B:
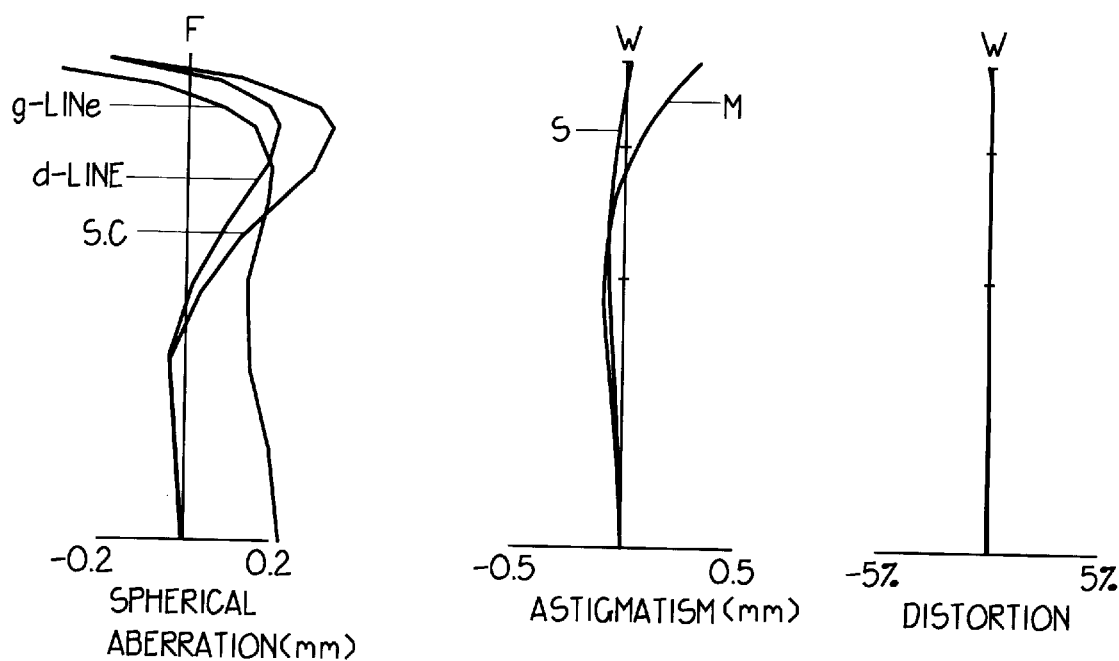

FIGS. 6A to 6B illustrate the superior aberration characteristics of the third preferred example, at a wide-angle and at a telephoto angle position, respectively.

Values for the fourth example of the present invention (see FIG. 7) are shown in Table 7, where: the focal length f ranges from 29.109 mm to 67.053 mm; the half viewing angle W ranges from 35.93° to 17.90°; the back focal length fb ranges from 10.224 mm to 46.028 mm and the iris value F ranges from 4.12 to 9.50.

TABLE 7

| surface number | radius of curvature $r_i$ | distance $d_i$ | refractive power nd | Abbe number v |
| --- | --- | --- | --- | --- |
| 1 | −13.293 | 2.00 | 1.83500 | 42.98 |
| *2 | −109.343 | 0.50 | | |
| 3 | 16.653 | 3.10 | 1.74400 | 44.90 |
| 4 | 12.008 | 2.87 | 1.48749 | 70.44 |
| 5 | −14.731 | 0.10 | | |
| 6 | 44.158 | 1.72 | 1.49700 | 81.61 |
| 7 | −17.630 | 1.00 | | |
| 8 | aperture | Z1 | | |
| *9 | −37.453 | 1.68 | 1.80518 | 25.46 |
| 10 | −19.879 | 3.81 | | |
| 11 | −8.422 | 1.20 | 1.80420 | 46.50 |
| 12 | −61.869 | fb | | | where * represents an aspherical surface and Z1 ranges from 7.834 mm to 1.600 mm during zooming.

According to the fourth example consistent with the present invention, the coefficient of the aspherical second lens surface is described by the above formula using the aspherical coefficients shown in Table 8.

TABLE 8

|  | aspherical coefficient of the second surface | aspherical coefficient of the ninth surface |
|---|---|---|
| K | 0.5000000000000E +3 | −0.1063354592806E +2 |
| A4 | 0.1852574894242E −3 | 0.4900859303605E −4 |
| A6 | 0.5823707995541E −6 | 0.4603361132574E −6 |
| A8 | 0.1303528224570E −6 | 0.8688904498410E −8 |
| A10 | 0 | 0 |

Figure 8A:
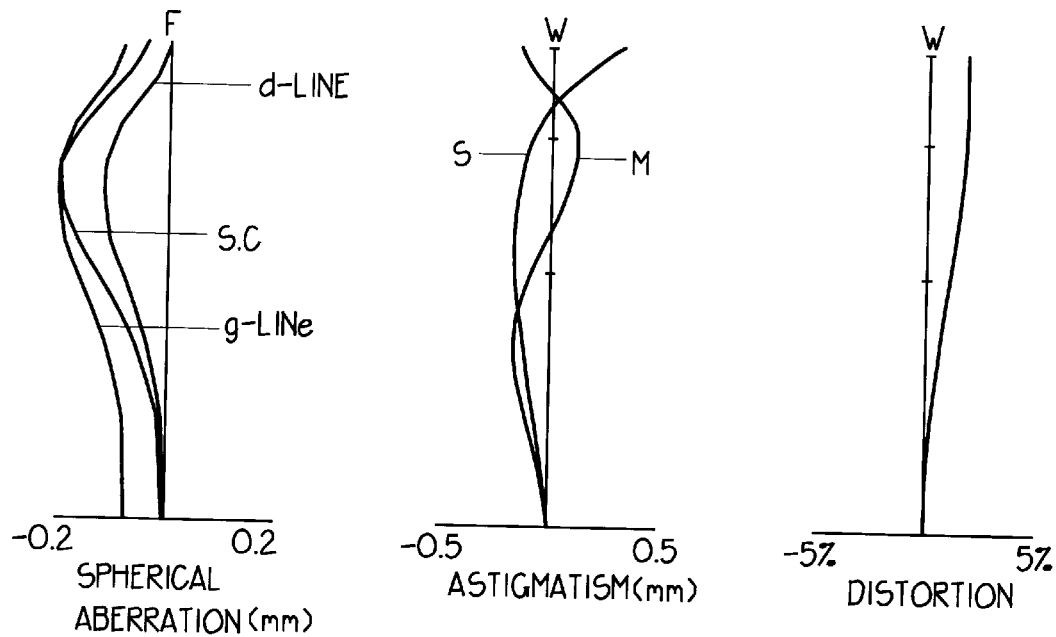
FIGS. 8A and 8B show the aberration curves of a compact zoom lens system at a wide-angle position and at a telephoto angle position, respectively, in accordance with a fourth preferred example of the invention.
Figure 8B:
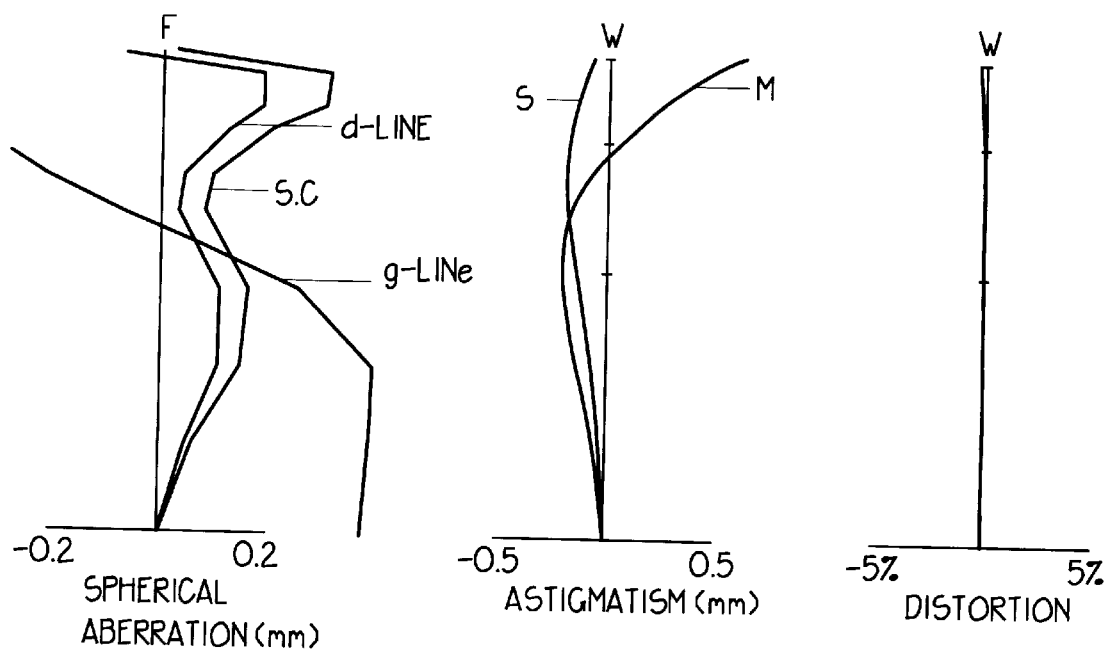

FIGS. 8A to 8B illustrate the superior aberration characteristics of the fourth preferred example, at a wide-angle and at a telephoto angle position, respectively.

Values for the fifth example consistent with the present invention (see FIG. 9) are shown in Table 9, where: the focal length f ranges from 29.079 mm to 57.907 mm; the half viewing angle W ranges from 36.51° to 20.50°; the back focal length fb ranges from 10.606 mm to 38.030 mm; and the iris value F ranges from 4.12 to 8.23.

TABLE 9

| surface number | radius of curvature $r_i$ | distance $d_i$ | refractive power nd | Abbe number v |
|---|---|---|---|---|
| 1 | −13.171 | 1.40 | 1.83500 | 42.98 |
| *2 | −102.932 | 0.60 |  |  |
| 3 | 23.912 | 3.59 | 1.49700 | 81.61 |
| 4 | −12.837 | 0.21 |  |  |
| 5 | 173.597 | 4.50 | 1.49700 | 81.61 |
| 6 | −13.928 | 1.00 |  |  |
| 7 | aperture | Z1 |  |  |
| *8 | −37.595 | 1.69 | 1.69895 | 30.05 |
| 9 | −18.312 | 3.65 |  |  |
| 10 | −8.237 | 1.20 | 1.80420 | 46.50 |
| 11 | −58.018 |  |  |  | where * represents an aspherical surface and Z1 ranges from 6.918 mm to 1.600 mm during zooming.

According to the fifth example consistent with the present invention, the coefficient of the aspherical second lens surface is described by the above formula using the aspherical coefficients shown in Table 10.

TABLE 10

|  | aspherical coefficients of the second surface | aspherical coefficients of the eighth surface |
|---|---|---|
| K | 0.5000000000000E +3 | −0.2127077752187E +2 |
| A4 | 0.2574242567356E −3 | 0.3882667872287E −4 |
| A6 | −0.3688061029487E −6 | 0.7718849684672E −6 |
| A8 | 0.2424354264061E −6 | 0.9883290934616E −8 |
| A10 | 0 | 0 |

Figure 10A:
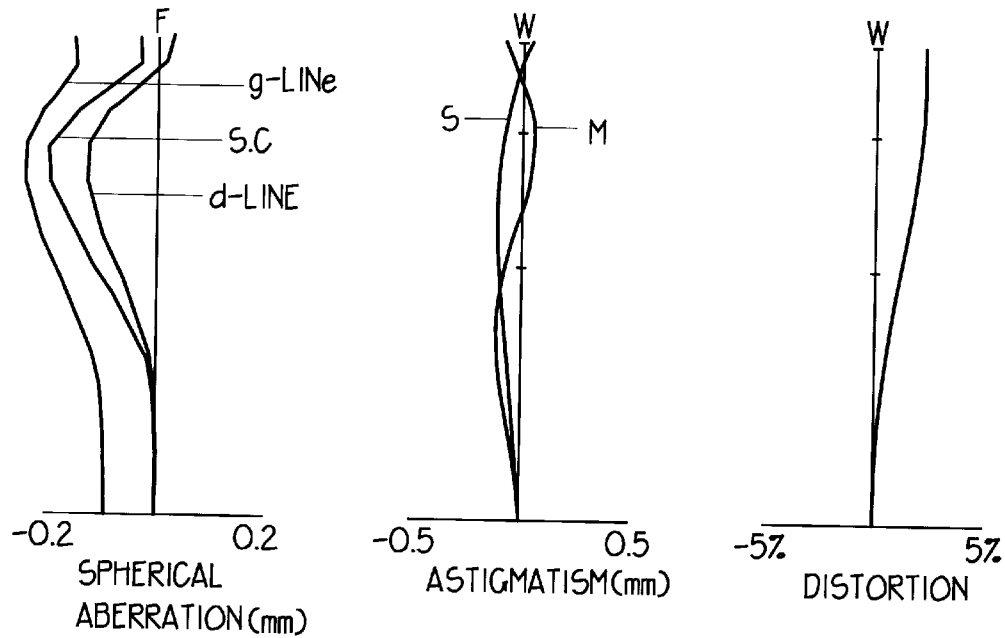
FIGS. 10A and 10B show the aberration curves of a compact zoom lens system at a wide-angle position and at a telephoto angle position, respectively, in accordance with a fifth preferred example of the invention.
Figure 10B:
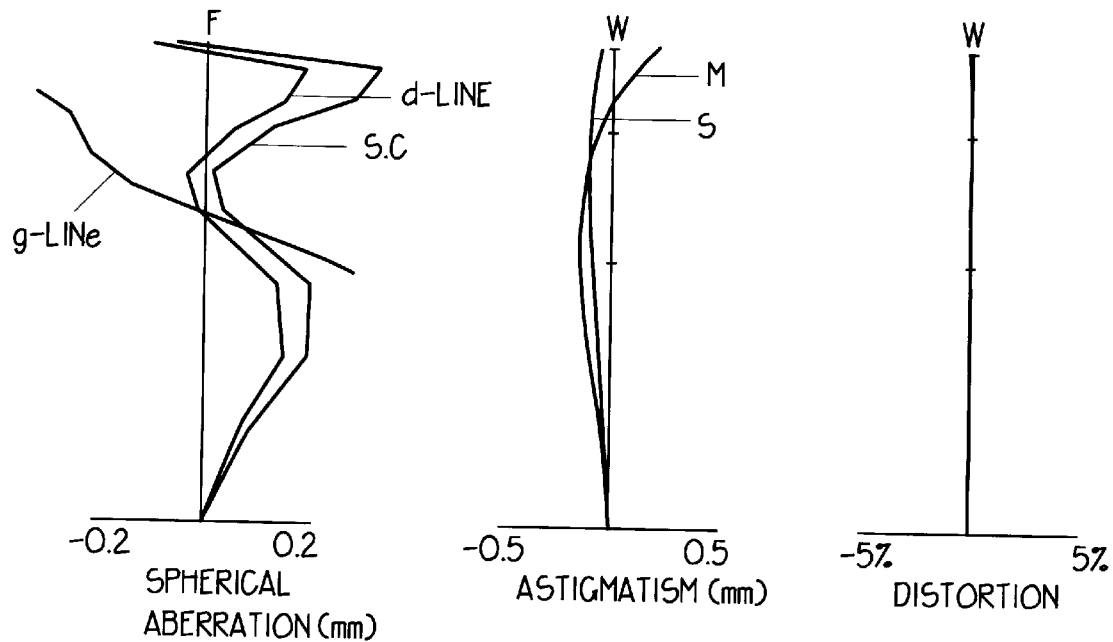

FIGS. 10A to 10B illustrate the superior aberration characteristics of the fifth preferred example, at a wide-angle and at a telephoto angle position, respectively.

Values for the sixth example consistent with the present invention (see FIG. 11) are shown in Table 11, where: the focal length f ranges from 29.100 mm to 67.00 mm; the half viewing angle W ranged from 36.27° to 17.90°; the back focal length fb ranges from 8.462 mm to 43.554 mm, and the iris value F ranges from 4.12 to 9.52.

TABLE 11

| surface number | radius of curvature $r_i$ | distance $d_i$ | refractive power nd | Abbe No. v |
|---|---|---|---|---|
| 1 | −28.769 | 1.74 | 1.81474 | 37.03 |
| *2 | 130.842 | 0.79 |  |  |
| 3 | 142.066 | 3.76 | 1.49700 | 81.61 |
| 4 | −12.262 | 1.72 |  |  |
| 5 | −30.785 | 3.79 | 1.49700 | 81.61 |
| 6 | −9.729 | 1.00 |  |  |
| 7 | aperture | Z1 |  |  |
| *8 | −24.667 | 1.60 | 1.80518 | 25.46 |
| 9 | −14.968 | 3.00 |  |  |
| 10 | −12.921 | 0.80 | 1.83400 | 37.34 |
| 11 | −50.856 | 2.44 |  |  |
| 12 | −11.679 | 0.80 | 1.80420 | 46.50 |
| 13 | −23.879 |  |  |  | where * represents an aspherical surface and Z1 ranges from 7.486 mm to 1.300 mm during zooming.

According to the sixth example consistent with the present invention, the coefficient of the aspherical second lens surface is described by the above formula using the aspherical coefficients shown in Table 12.

TABLE 12

|  | aspherical coefficients of the second surface | aspherical coefficients of the eighth surface |
|---|---|---|
| K | 0.2000000000000E +3 | −0.2074564957433E +2 |
| A4 | 0.2636552815117E −3 | −0.1588541299346E −3 |
| A6 | 0.2065717101246E −5 | 0.2244194501288E −5 |
| A8 | 0.3455605321177E −7 | −0.1732353552749E −7 |
| A10 | 0 | 0 |

Figure 12A:
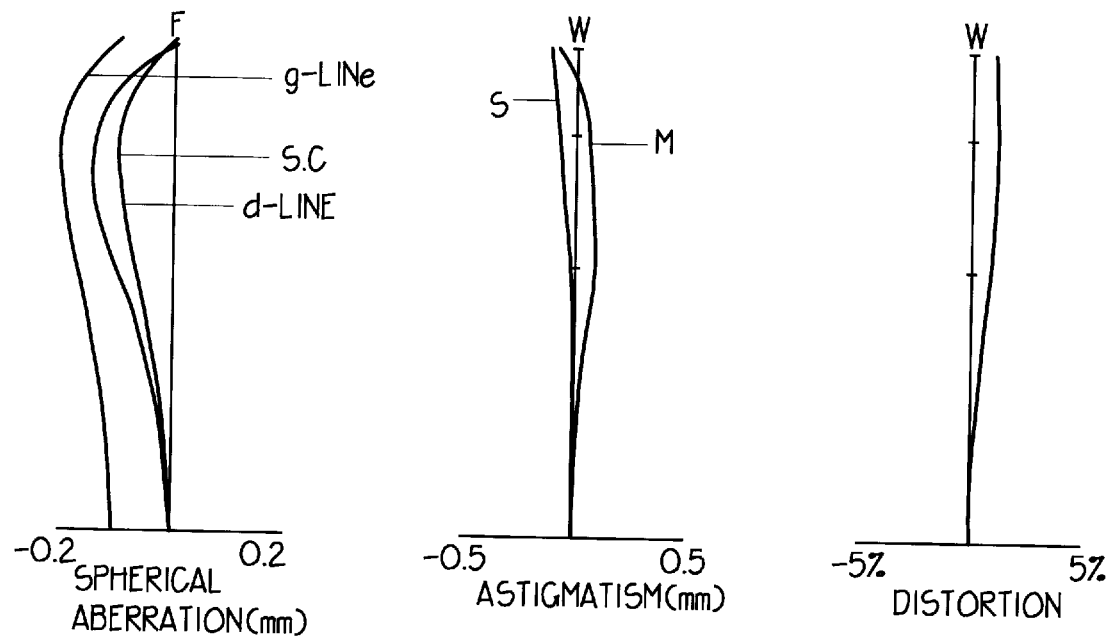
FIGS. 12A and 12B show the aberration curves of a compact zoom lens system at a wide-angle position and at a telephoto angle position, respectively, in accordance with a sixth preferred example of the invention.
Figure 12B:
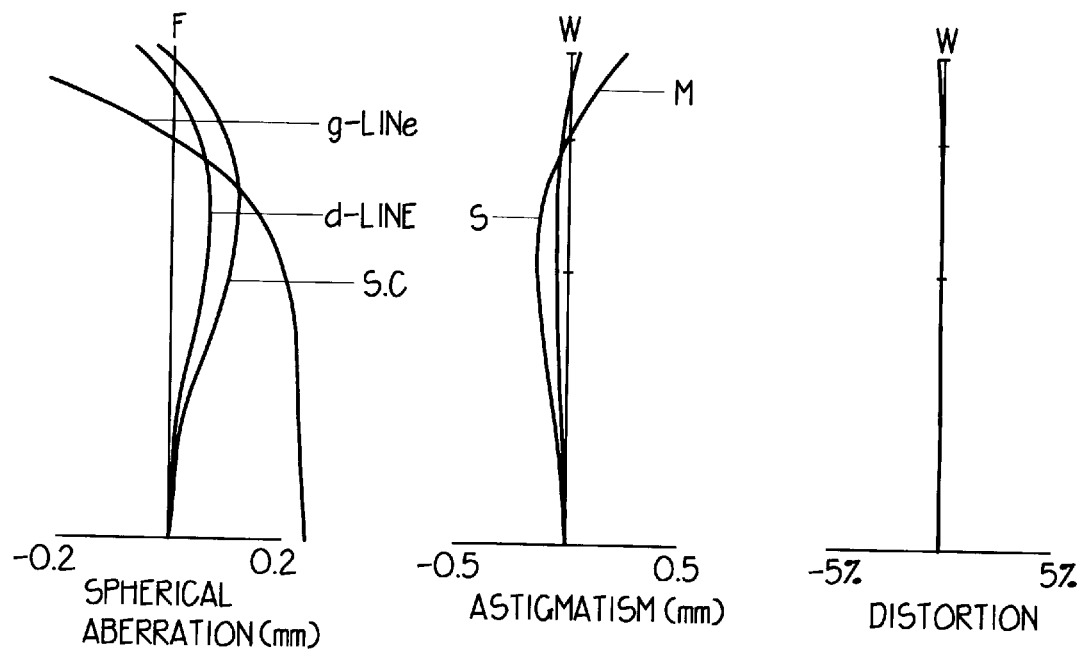

FIGS. 12A to 12B illustrate the superior aberration characteristics of the sixth preferred example, at a wide-angle and at a telephoto angle position, respectively.

Values for the seventh example consistent with the present invention (see FIG. 13) are shown in Table 13, where: the focal length f ranges from 29.094 mm to 58.037 mm; the half viewing angle W ranged from 35.98° to 20.53°; the back focal length fb ranges from 6.5 mm to 33.025 mm, and the iris value F ranges from 5.6 to 11.16.

TABLE 13

| surface number | radius of curvature $r_i$ | distance $d_i$ | refractive power nd | Abbe No. v |
|---|---|---|---|---|
| 1 | −13.455 | 1.00 | 1.83500 | 49.98 |
| 2 | −21.832 | 0.26 |  |  |
| 3 | −13.759 | 1.00 | 1.83027 | 43.26 |
| 4 | −31.899 | 0.10 |  |  |
| 5 | 12.989 | 3.50 | 1.84666 | 26.52 |
| 6 | 7.152 | 3.44 | 1.51680 | 52.33 |
| 7 | −17.753 | 0.18 |  |  |
| 8 | 24.714 | 1.50 |  |  |
| 9 | −45.388 | 1.12 | 1.73252 | 43.72 |
| 10 | aperture | Z1 |  |  |
| 11 | −43.769 | 2.47 |  |  |
| 12 | −13.437 | 1.13 | 1.68626 | 30.80 |
| 13 | −13.128 | 0.80 |  |  |
| 14 | −77561.370 | 3.94 | 1.74282 | 49.68 |
| 15 | −10.424 | 1.00 |  |  |
| 16 | −19.402 | 6.49 | 1.83500 | 42.98 | where Z1 ranges from 9.405 mm to 3.203 mm during zooming.

Figure 14A:
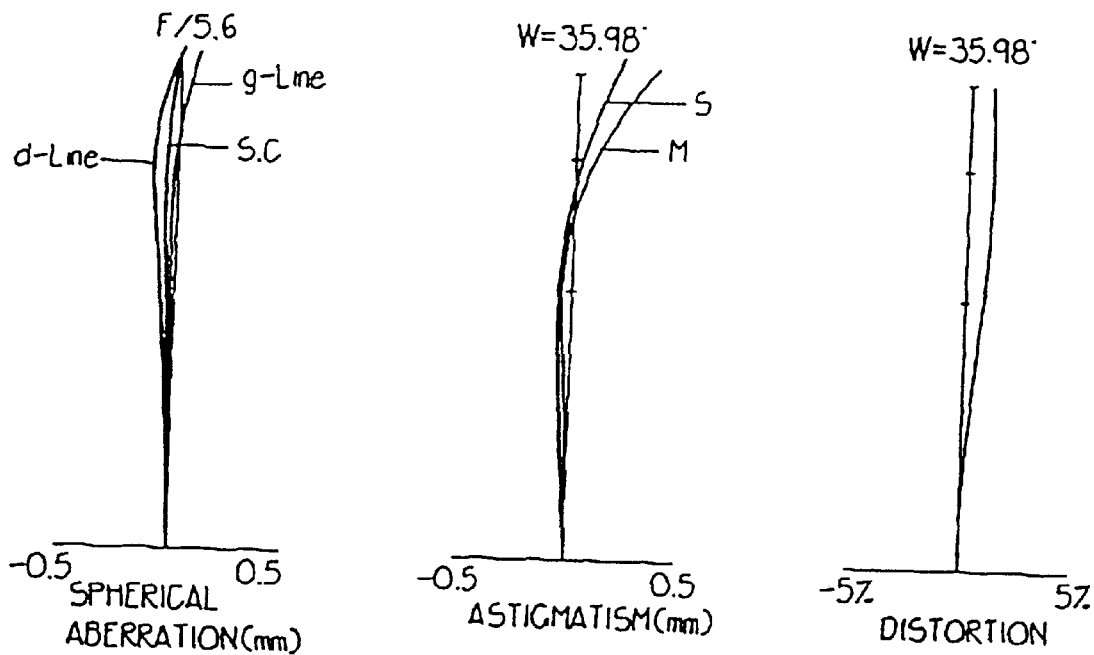
FIGS. 14A and 14B show the aberration curves of a compact zoom lens system at a wide-angle position and at a telephoto angle position, respectively, in accordance with a seventh preferred example of the invention.
Figure 14B:
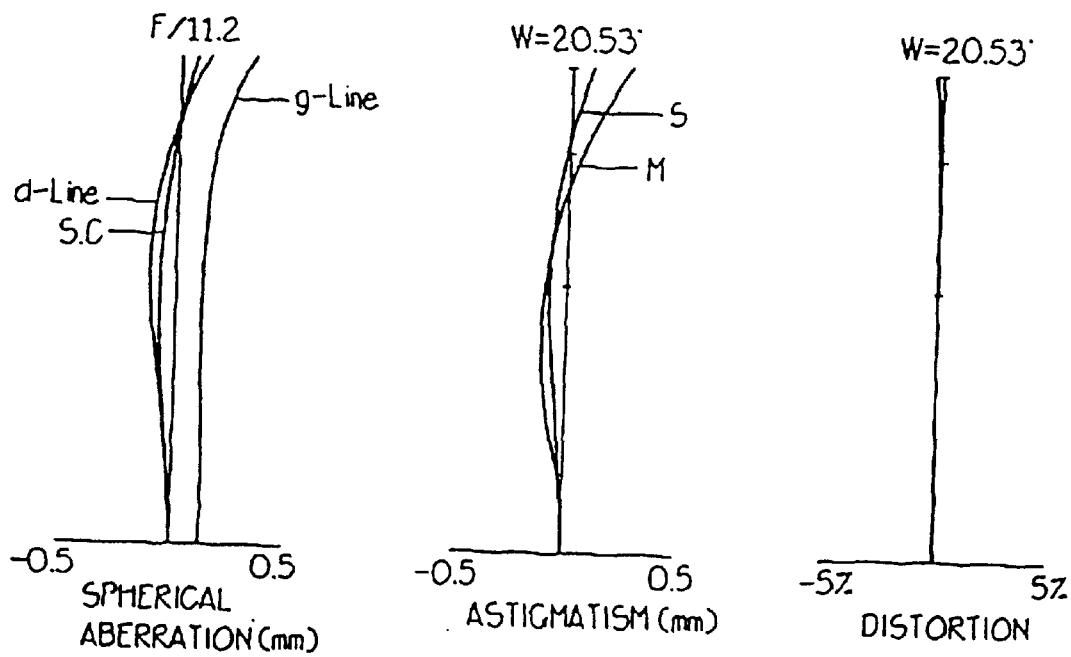

FIGS. 14A to 14B illustrate the superior aberration characteristics of the seventh preferred example, at a wide-angle and at a telephoto angle position, respectively.

Zoom lens systems consistent with the present invention provide a compact wide-angle zoom lens system which has two lens groups and a zoom ratio of about 2.0 times. While preferred embodiments consistent with the present invention have been described above, it will be obvious to those skilled in the art that various changes and modification can be readily made therein without departing from the scope and sprit of the invention as defined by the appended claims.

What is claimed is:

1. A zoom lens system comprising:
   a first lens group which has an overall positive refractive power, the first lens group comprising:
   a first sub-group lens unit which has a negative refractive power;
   a second sub-group lens unit which has a positive refractive power; and
   a third sub-group lens unit which has a positive refractive power;
   a second lens group which has an overall negative refractive power, the second lens group comprising:
   a fourth sub-group lens unit which has a positive refractive power; and
   a fifth sub-group lens unit which has a negative refractive power; and
   wherein the magnification of the system can be changed by varying a distance between the first lens group and the second lens group, and wherein the following conditions are satisfied:

$Mt/Mw>1.95$, $0.20<fbw/fw<0.37$, where:
   Mt represents the magnification of the second lens group at a telephoto position;
   Mw represents the magnification of the second lens group at a wide-angle position;
   fw represents a focal length of the zoom lens system at the wide-angle position, and
   fbw represents a back focal length of the zoom lens system at the wide-angle position.

2. The system of claim 1, wherein the following conditions are satisfied:

$0.55<f1/fw<0.75$, $0.45<|f2/fw|<0.65$, where:
   f1 represents a focal length of the first lens group; and
   f2 represents a focal length of the second lens group.

3. The system of claim 1, wherein the following conditions are satisfied:

$Lt<ft<1.00$, $0.65<(Lt-Lw)/fw<1.10$, where:
   Lt represents a length of the zoom lens system at the telephoto position;
   ft represents a focal length of the zoom lens system at the telephoto position; and
   Lw represents a length of the zoom lens system at the wide-angle position.

4. The system of claim 1, wherein the following conditions are satisfied:

$0.50<|f1a/fw|<1.10$, $0.45<f1b/fw<0.85$, $0.70<f1c/fw<1.20$, where:
   f1a represents a focal length of the first sub-group lens unit;
   f1b represents a focal length of the second sub-group lens unit; and
   f1c represents a focal length of the third sub-group lens unit.

5. The system of claim 1, wherein the following conditions are satisfied:

$0.90<f2a/fw<1.80$, $0.25<|f2b/fw|<0.50$, where:
   f2a represents a focal length of the fourth sub-group lens unit; and
   f2b represents a focal length of the fifth sub-group lens unit.

6. The system of claim 1, wherein the following conditions are satisfied:

$1.48<N1p<1.65$, $45.0<V1p<85.0$, where:
   N1p represents an average refractive index of lenses in the first lens group having a positive refractive power; and
   V1p represents an average Abbe number of lenses in the first lens group having a positive refractive power.

7. The system of claim 6, wherein the following conditions are satisfied:

$1.49<N1b<1.70$, $35.0<V1b<85.0$, where:
   N1b represents an average refractive index of the second sub-group lens unit; and
   V1b represents an average Abbe number of the second sub-group lens unit.

8. The system of claim 6, wherein the following conditions are satisfied:

$1.49<N1c<1.55$, $40.0<V1c<85.0$, where:
   N1c represents an average refractive index of the third sub-group lens unit; and
   V1c represents an average Abbe number of the third sub-group.

9. The system of claim 1, wherein the following conditions are satisfied:

$1.75<N1n<1.85$, $30.0<V1n<45.0$, where:
   N1n represents an average refractive index of lenses in the first lens group having a negative refractive power; and V1n represents an average Abbe number of lenses in the first lens group having a negative refractive power.

10. The system of claim 9, wherein the following conditions are satisfied:

$$N1a > 1.75,$$

$$35.0 < V1a < 45.0,$$

where:

N1a represents an average refractive index of the first sub-group lens unit; and V1a represents an average Abbe number of the first sub-group lens unit.

11. The system of claim 1, wherein the following conditions are satisfied:

$$1.65 < N2p < 1.85,$$

$$23.0 < V2p < 40.0,$$

where:

N2p represents an average refractive index of lenses in the second lens group having a positive refractive power; and V2p represents an average Abbe number of lenses in the second lens group having a positive refractive power.

12. The system of claim 1, wherein the following conditions are satisfied:

$$1.75 < N2n < 1.85,$$

$$40.0 < V2n < 50.0,$$

where:

N2n represents an average refractive index of lenses in the second lens group having a negative refractive power; and V2n represents an average Abbe number of lenses in the second lens group having a negative refractive power.

13. The system of claim 1, wherein the first lens group includes a lens having at least one aspherical surface.

14. A zoom lens system comprising:

a first lens group which has an overall positive refractive power, the first lens group comprising:
 a first sub-group lens unit which has a negative refractive power and a lens that is concave toward an object;
 a second sub-group lens unit which has a positive refractive power;
 a third sub-group lens unit which has a positive refractive power; and
 wherein at least one of the first through third sub-group lens units includes at least one lens having an aspherical surface;

a second lens group which has an overall negative refractive power, the second lens group comprising:
 a fourth sub-group lens unit which has a positive refractive power; and
 a fifth sub-group lens unit which has a negative refractive power; and wherein the magnification of the system can be changed by varying a distance between the first lens group and the second lens group, and wherein the following conditions are satisfied:

$$Mt/Mw > 1.90,$$

$$0.18 < fbw/fw < 0.38,$$

where:

Mt represents the magnification of the second lens group at a telephoto position;

Mw represents the magnification of the second lens group at a wide-angle position;

fw represents a focal length of the zoom lens system at the wide-angle position; and fbw represents a back focal length of the zoom lens system at the wide-angle position.

15. The system of claim 14, wherein the following conditions are satisfied:

$$0.50 < f1/fw < 0.80,$$

$$0.45 < |f2/fw| < 0.70,$$

where:

f1 represents a focal length of the first lens group; and f2 represents a focal length of the second lens group.

16. The system of claim 14, wherein the following conditions are satisfied:

$$Lt < ft < 1.05,$$

$$0.65 < (Lt-Lw)/fw < 1.15,$$

where:

Lt represents a length of the zoom lens system at the telephoto position;

ft represents a focal length of the zoom lens system at the telephoto position; and Lw represents a length of the zoom lens system at the wide-angle position.

17. The system of claim 14, wherein the following conditions are satisfied:

$$0.45 < |f1a/fw| < 1.15,$$

$$0.40 < f1b/fw < 0.90,$$

$$0.75 < f1c/fw < 1.25,$$

where:

f1a represents a focal length of the first sub-group lens unit;

f1b represents a focal length of the second sub-group lens unit; and f1c represents a focal length of the third sub-group lens unit.

18. The system of claim 14, wherein the following conditions are satisfied:

$$0.85 < f2a/fw < 1.85,$$

$$0.20 < |f2b/fw| < 0.55,$$

where:

f1a represents a focal length of the fourth sub-group lens unit; and f2b represents a focal length of the fifth sub-group lens unit.

19. The system of claim 14, wherein the following conditions are satisfied:

$$1.48 < N1p < 1.60,$$

$$45.0 < V1p < 85.0,$$

where:
N1p represents an average refractive index of lenses in the first lens group having a positive refractive power; and
V1p represents an average Abbe number of lenses in the first lens group having a positive refractive power.

20. The system of claim 19, wherein the following conditions are satisfied:

$$1.48 < N1b < 1.75,$$

$$30.0 < V1b < 85.0,$$

where:
N1b represents an average refractive index of the second sub-group lens unit, and
V1b represents an average Abbe number of the second sub-group lens unit.

21. The system of claim 19, wherein the following conditions are satisfied:

$$1.48 < N1c < 1.60,$$

$$45.0 < V1c < 85.0,$$

where:
N1c represents an average refractive index of the third sub-group lens unit; and
V1c represents an average Abbe number of the third sub-group.

22. The system of claim 14, wherein the following conditions are satisfied:

$$1.70 < N1n < 1.85,$$

$$25.0 < V1n < 45.0,$$

where:
N1n represents an average refractive index of lenses in the first lens group having a negative refractive power; and
V1n represents an average Abbe number of lenses in the first lens group having a negative refractive power.

23. The system of claim 22, wherein the following conditions are satisfied:

$$N1a > 1.70,$$

$$30.0 < V1a < 45.0,$$

where:
N1a represents an average refractive index of the first sub-group lens unit; and
V1a represents an average Abbe number of the first sub-group lens unit.

24. The system of claim 14, wherein the following conditions are satisfied:

$$1.57 < N2p < 1.85,$$

$$23.0 < V2p < 45.0,$$

where:
N2p represents an average refractive index of lenses in the second lens group having a positive refractive power; and
V2p represents an average Abbe number of lenses in the second lens group having a positive refractive power.

25. The system of claim 14, wherein the following conditions are satisfied:

$$1.75 < N2n < 1.85,$$

$$35.0 < V2n < 55.0,$$

where:
N2n represents an average refractive index of lenses in the second lens group having a negative refractive power; and
V2n represents an average Abbe number of lenses in the second lens group having a negative refractive power.

26. A zoom lens system comprising:
a first lens group which has an overall positive refractive power, the first lens group comprising:
a first sub-group lens unit which has a negative refractive power and a lens that is concave toward an object;
a second sub-group lens unit which has a positive refractive power and contains only one lens;
a third sub-group lens unit which has a positive refractive power; and
wherein at least one of the first through third sub-group lens units includes at least one lens having an aspherical surface;
a second lens group which has an overall negative refractive power, the second lens group comprising:
a fourth sub-group lens unit which has a positive refractive power; and
a fifth sub-group lens unit which has a negative refractive power; and
wherein the magnification of the system can be changed by varying a distance between the first lens group and the second lens group, and wherein the following conditions are satisfied:

$$Mt/Mw > 1.85,$$

$$0.15 < fbw/fw < 0.40,$$

where:
Mt represents the magnification of the second lens group at a telephoto position;
Mw represents the magnification of the second lens group at a wide-angle position;
fw represents a focal length of the zoom lens system at the wide-angle position; and
fbw represents a back focal length of the zoom lens system at the wide-angle position.

27. The system of claim 26, wherein the following conditions are satisfied:

$$0.50 < f1/fw < 0.80,$$

$$0.45 < |f2/fw| < 0.70,$$

where:
f1 represents a focal length of the first lens group; and
f2 represents a focal length of the second lens group.

* * * * *

UNITED STATES PATENT AND TRADEMARK OFFICE
CERTIFICATE OF CORRECTION

PATENT NO. : 5,900,991
DATED : May 4, 1999
INVENTOR(S) : Geon-Mo KANG

It is certified that error appears in the above-identified patent and that said Letters Patent is hereby corrected as shown below:

Claim 18, Col. 16, line 58, "f1a" should read --f2a--.

Signed and Sealed this

Sixteenth Day of November, 1999

Attest:

Attesting Officer

Q. TODD DICKINSON

Acting Commissioner of Patents and Trademarks